US009417337B2

(12) United States Patent
Thorns (10) Patent No.: US 9,417,337 B2
(45) Date of Patent: Aug. 16, 2016

(54) DEVICE FOR READING OUT EXPOSED IMAGING PLATES (71) Applicant: Michael Thorns, Bietigheim-Bissingen (DE)

(72) Inventor: Michael Thorns, Bietigheim-Bissingen (DE)

(*) Notice: Subject to any disclaimer, the term of this patent is extended or adjusted under 35 U.S.C. 154(b) by 0 days.

(21) Appl. No.: 14/276,108

(22) Filed: May 13, 2014

(65) Prior Publication Data
US 2014/0246593 A1 Sep. 4, 2014

Related U.S. Application Data (63) Continuation of application No. 11/992,615, filed as application No. PCT/EP2006/008262 on Aug. 23, 2006, now abandoned.

(30) Foreign Application Priority Data

Sep. 27, 2005 (DE) .................. 10 2005 046 249

(51) Int. Cl.
G03B 42/08 (2006.01)
G01T 1/20 (2006.01)

(52) U.S. Cl.
CPC ............. *G01T 1/2016* (2013.01); *G01T 1/2014* (2013.01); *G03B 42/08* (2013.01)

(58) Field of Classification Search
CPC ..... G01T 1/2016; G01T 1/2014; G03B 42/08
See application file for complete search history.

(56) References Cited

U.S. PATENT DOCUMENTS

| 4,687,937 A * | 8/1987 | Aagano et al. ............ 250/588 |
| 4,727,252 A | 2/1988 | Yoshimura et al. |
| 4,754,145 A * | 6/1988 | Kobayashi ............... 250/588 |
| 4,868,387 A | 9/1989 | Yamada et al. |
| 4,883,961 A | 11/1989 | Arakawa et al. |
| 5,081,357 A | 1/1992 | Agano |
| 5,095,209 A | 3/1992 | Tamura |
| 5,237,177 A * | 8/1993 | Kimura ................... 250/580 |
| 5,818,065 A | 10/1998 | Exelmans |
| 5,971,311 A | 10/1999 | Fujii et al. |
| 6,365,909 B1 * | 4/2002 | Hayakawa et al. ......... 250/584 |
| 6,599,014 B2 | 7/2003 | Thoms |
| 6,960,778 B2 | 11/2005 | Furue |
| 6,990,254 B2 * | 1/2006 | Nahum .................... 382/278 |
| 2002/0148988 A1 * | 10/2002 | Thoms .................... 250/585 |
| 2004/0138372 A1 | 7/2004 | Uschold et al. |
| 2004/0169152 A1 | 9/2004 | Tsutoh et al. |
| 2004/0238768 A1 | 12/2004 | Urbon |
| 2005/0022425 A1 | 2/2005 | Brown |
| 2005/0205813 A1 | 9/2005 | Ishikawa |
| 2006/0214124 A1 | 9/2006 | Nakajo |
| 2009/0267006 A1 | 10/2009 | Thoms |
| 2012/0326053 A1 | 12/2012 | Thoms |

FOREIGN PATENT DOCUMENTS

| EP | 1 707 991 A1 | 10/2006 |
| JP | 53-75536 A | 7/1978 |
| JP | 59-083037 A1 | 5/1984 |
| JP | 07-306487 A1 | 11/1995 |
| JP | 8-62746 A1 | 3/1996 |
| JP | 2004-012689 A1 | 1/2004 |
| WO | 0118796 A1 | 3/2001 |

OTHER PUBLICATIONS

"Common," Mirriam-Webster Dictionary, Accessed Nov. 12, 2013—copy provided by USPTO attached hereto.

* cited by examiner

*Primary Examiner* — Casey Bryant
(74) *Attorney, Agent, or Firm* — Factor Intellectual Property Law Group, Ltd.

(57) ABSTRACT

A combined device for reading out and erasing imaging plates comprises an eraser disposed down-stream of a readout unit at a short distance thereof, said eraser being separated from the readout unit by a light barrier.

20 Claims, 7 Drawing Sheets

DEVICE FOR READING OUT EXPOSED IMAGING PLATES

RELATED APPLICATIONS

This application is a continuation of U.S. patent application Ser. No. 11/992,615 filed Mar. 26, 2008, which claims the filing benefit of PCT Patent Application No. PCT/EP2006/008262, filed Aug. 23, 2006, which claims the benefit of German Patent Application No. 10 2005 046 249.9, filed Sep. 27, 2005; the contents of all of which are incorporated herein by reference.

TECHNICAL FIELD

The invention relates to a device for reading out exposed imaging plates, according to the precharacterising portion of a device for reading out exposed imaging plates, with retaining means for retaining in given geometry an imaging plate to be read out, with a reading unit which generates a reading light beam which is moved in a first scanning direction and exhibits detection means for detecting fluorescent light released in the imaging plate by the reading beam, and with a drive device for generating a relative motion between the imaging plate and the reading unit in a second scanning direction, different from the first scanning direction, wherein an erasing unit is arranged in the direction of the second scanning direction behind the reading unit and aligned with the latter, in that the drive device is designed in such a way that it also extends over the erasing unit, and in that a light barrier is arranged between the reading unit and the erasing unit.

BACKGROUND OF THE INVENTION

Exposed imaging plates contain a latent X-ray image, in the form of locally excited metastable excited states of colour centres, which is obtained by the imaging plate being placed behind an object in X-ray light generated by an X-ray source.

This latent image is read out by the imaging plate being scanned, point by point, with a readout beam of small diameter. The wavelength of the readout light is chosen in such a way that it excites a metastable excited centre into a higher electron state which rapidly decays, accompanied by fluorescence.

The fluorescent light emitted in such a way is measured with a detection device which, for example, may contain a photomultiplier by way of light-sensitive element. From the electrical output signal of the detection means and from electrical signals that reproduce the instantaneous position of the readout beam, an image of the transmission of the object, expressed by electrical signals, can then be obtained.

An advantage of the imaging plates in comparison with conventional X-ray films is the fact that the imaging plates can often be used again. Since in the course of the readout procedure some of the excited electron states of the centres remain behind by reason of the only brief local exposure by the readout beam, it is necessary to erase the imaging plate reliably before a new recording by irradiating it intensely and for a relatively long time with erasing light. If this is not done, a shadow of the preceding X-ray image may appear on the next X-ray image.

The erasing devices that have been used hitherto for imaging plates are separate instruments, into which the imaging plates are passed when they have left the readout device. With regard to the high costs of the imaging plates and the large number of radiographs that are taken in hospitals and similar institutions, it is advantageous if an imaging plate is available again as quickly as possible after the latent image has been read out.

The present invention is directed to addressing these and other matters.

SUMMARY OF THE INVENTION

For the purpose of achieving this object, by means of the present invention a device for reading out exposed imaging plates is specified with which the erasing of remnants of the latent image which remain after the readout is effected substantially synchronously with the readout. The device for reading out exposed imaging plates having retaining means for retaining in given geometry an imaging plate to be read out, with a reading unit which generates a reading light beam which is moved in a first scanning direction and exhibits detection means for detecting fluorescent light released in the imaging plate by the reading beam, and with a drive device for generating a relative motion between the imaging plate and the reading unit in a second scanning direction, different from the first scanning direction, an erasing unit is arranged in the direction of the second scanning direction behind the reading unit and aligned with the latter, in that the drive device is designed in such a way that it also extends over the erasing unit, and in that a light barrier is arranged between the reading unit and the erasing unit.

With the further development of the invention including a light-source that exhibits a bundle of erasing-light-absorbing lamellae which are arranged in parallel, with a spacing, the edges of which pointing towards the imaging plate are spaced from the trajectory of the imaging plate. With such a light source, it is ensured that, with a small dimension of the light barrier in the conveying direction of the imaging plate, a very reliable partitioning of the light to the reading head is obtained. Such small dimensions in the conveying direction of the imaging plates are therefore of interest, since in this way the erasing head can be provided very close to the reading head. By this means, the time that is needed overall in the device for the readout and erasure becomes only insignificantly longer in comparison with the time-interval that is needed for the readout of the imaging plate alone.

In the course of the erasing of remnants of the latent image, fluorescent light also arises at the erasing head. With the further development of the invention providing that the lamellae also absorb fluorescent light which guarantees that not only no erasing light but also no fluorescent light gets from the region of the erasing head into the region of the reading head where, as a result, the readout of subsequent image regions could be disturbed.

In the case of a light barrier, the clearance between the edges of at least some of the lamellae facing towards the imaging plate amounts to about 0.05 mm to about 0.2 mm which are thin absorbent chambers which extend away from the conveying face of the imaging plate and the free edges of the lamellae pointing towards the imaging plate small, so that only few reflections are obtained there.

With the further development of the invention including the edges of at least some of the lamellae facing towards the trajectory of the imaging plate are sharpened in order to ensure that a reflection on the free edges of the lamellae is again reduced.

With the further development of the invention including a light barrier wherein the lamellae are spaced by intermediate second lamellae, the edges of which facing towards the imaging plate exhibit greater spacing from the imaging plate than the corresponding edges of the first lamellae. This can be produced very easily by forming a stack consisting of two different types of lamella.

With the further development of the invention providing that the spacing between the free edges of the second lamellae and the trajectory of the imaging plate amounts to at least 10 times the spacing between the free edges of the first lamellae and the trajectory of the imaging plate guaranteeing that, even when the absorbently configured surfaces—for example, surfaces covered with black lacquer—of the lamellae still reflect some light, a good absorption is guaranteed overall by virtue of the depth of the flat pockets situated between the lamellae.

In the case of a light barrier that is designed in a manner where the second lamellae exhibit interruptions which are connected to a cooling-gas distributor space, a cooling gas can be supplied to the flat pockets situated between the lamellae, and in this way the heat arising in the course of the absorption of light can be dissipated well. In this way, contaminants such as dust, which in the course of time could form centres for the reflection of light, are also prevented from being deposited in these flat pockets.

With the further development of the invention providing that the lamellae exhibit regions pressed out of their plane, via which they are spaced meaning a lamellar stack can be produced by using only one type of lamella in very simple manner.

The peripheral direction the lamellae are provided symmetrically with regions pressed out of their plane, and the pressed-out regions of adjacent lamellae are offset in relation to one another guaranteeing that the lamellae do not tilt against one another and are stacked one behind the other in very producible and reliable manner.

The further development of the invention providing that the peripheral surface of the lamellar bundle are connected to a distributor space for cooling gas which is advantageous with regard to good dissipation of heat from the light barrier.

The further development of the invention including a light barrier that includes a pile made of absorbent textile material which will satisfy the requirements for many cases. It can be produced particularly inexpensively and simply.

With the further development of the light barrier including a pile includes that the pile is a pile-loop fluorine, it is ensured that when the fluorine of the light barrier is arranged particularly close to the trajectory of the imaging plates any chance contacts of the ends of the fluorine loops do not leave scratches behind on the surface of the plate.

The further development of the light barrier including a pile wherein the pile is produced from a material that absorbs in volume which is advantageous with regard to absorption of erasing light and fluorescent light that is as complete as possible.

If the individual fluorine fibres contained in the pile of the light-barrier are treated so that the absorbent material is frosted on its outside, residual reflections on the fibre surface are largely eliminated.

The same holds for fibrous material having the outer surface of the textile material studded with absorbent particles.

A further development of the invention includes an erasing-light source including a fluorescent lamp, which is distinguished by little evolution of heat.

A still further development of the invention includes an erasing-light source that includes a plurality of light-emitting diodes which are spaced in such a manner that their light cones overlap in the surface of the plate, which is distinguished by low energy consumption and compact dimensions, as well as long life.

Still further developments include light-emitting diodes that are arranged in several rows spaced in the conveying direction of the imaging plate, wherein the diodes of consecutive rows are offset in relation to one another, and the light-emitting diodes are arranged on a carrying body that is driven in the direction perpendicular to the conveying direction of the imaging plates, which guarantees a uniform erasure of the imaging plate.

These and other objects and advantages will be made apparent from the following brief description of the drawings and the detailed description of the invention.

DETAILED DESCRIPTION OF THE INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
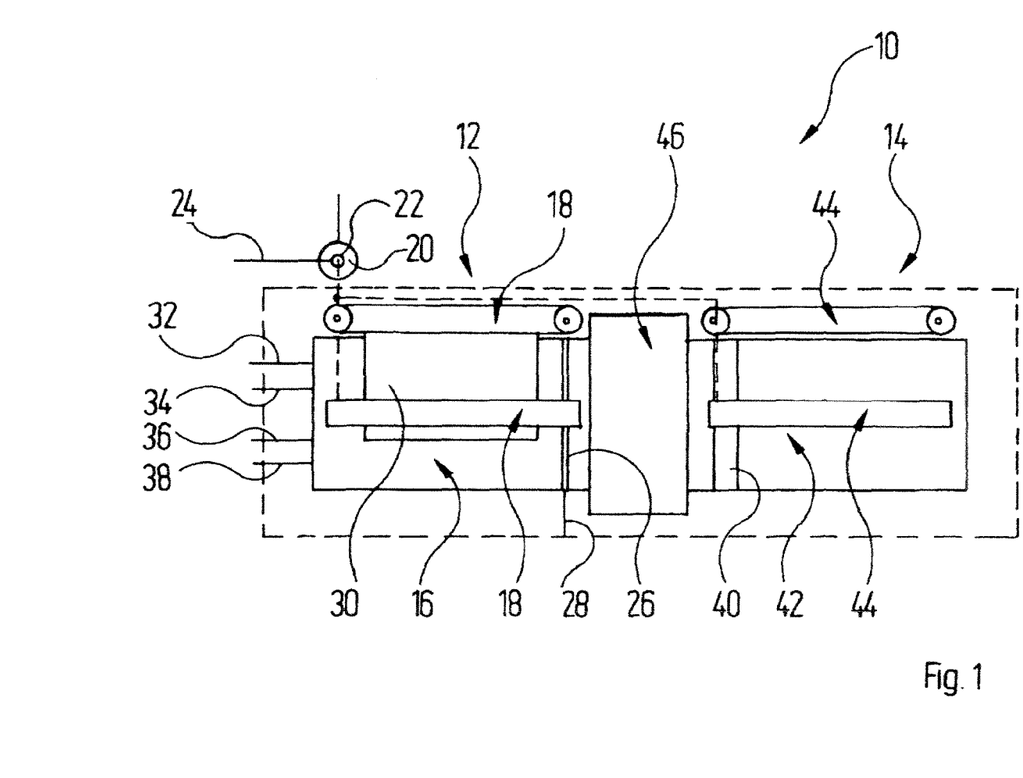
FIG. 1: shows a schematic lateral view of a combined device for reading out and simultaneously erasing the light-sensitive layer of an imaging plate.

A combined device for reading out and erasing exposed imaging plates is denoted overall by 10 in FIG. 1. It consists of a readout unit, denoted overall by 12, and an erasing unit, denoted overall by 14.

The readout unit 12 includes a mounting table 16 which exhibits cylindrical shape and three belt conveyors 18 distributed around the periphery of the mounting table, which are coupled to one another mechanically and connected to the output shaft of an electric motor 20. The electric motor 20 is, in turn, connected to a position indicator 22. The latter provides its output signal on a line 24.

The mounting table 16 has an annular gap 26 extending in the peripheral direction, through which a peripheral reading beam 28 emerges. It is a question of laser light with a wavelength that is suitable for further excitation of a metastably excited centre of an imaging plate. With respect to particulars of the reading head, reference is made to WO 01/18796 A1, the content of which is hereby also to be made part of the present application.

Indicated by 30 in the drawing is an exposed imaging plate which is arranged with its light-sensitive layer downward on the mounting table 16. It is held in cylindrical geometry by the three belt conveyors 18 which are distributed in the peripheral direction. At the same time, the belt conveyors 18 move the imaging plate 30 in FIG. 1 to the right and across the annular gap 26. In the process, the image-points of the latent image that are situated precisely above the annular gap are read out by the peripheral light beam 28.

The readout unit 12 receives, via a line 32, an operating voltage for supplying the various loads contained in it and emits, via a line 34, an electrical signal corresponding to the instantaneous angular position of the reading beam 28, and, via a line 36, the output signal of a photomultiplier contained in it.

The position indicator 22 coupled with the electric motor 20 emits an output signal that corresponds to the position of the imaging plate 30 with respect to the annular gap 26.

From the electrical signals applied to the lines 24, 34 and 36 it is then possible for the electronic image of the latent X-ray image to be generated, as described in detail in WO 01/19796 A1.

The erasing unit 14 has a broad transparent exit window 40 for erasing light, extending in the peripheral direction, the external face of which constitutes a smooth continuation of a mounting table 42. Distributed around the mounting table 42 are belt conveyors 44 which are mechanically coupled with one another and with the belt conveyors 18.

From the annular exit window 40 an annular curtain of erasing light emerges. Since the erasing light acts simultaneously on all the points of the imaging plate situated on a scan line in the peripheral direction, simply by reason of the time-factor (ratio of pixel to scan line) a stronger illumination obtains in the erasing unit 14 than above the annular gap 26 of the reading unit. Furthermore, the erasing light can also be chosen to be more broadband, and can be generated by a non-coherent light-source.

The fluorescent lamp 48 may be a warm-tone tubular fluorescent lamp. With such lamps an illuminance of 50,000 lx can be obtained. For the purpose of erasing an imaging plate, a quantity of light of approximately 500,000 lx s is needed if it is desired to obtain the erasure within a short time synchronously with the readout of the imaging plate.

If readout and erasure take place in a combined readout-and-erase device with a common transport device which moves the imaging plates through the reading unit and the erasing unit, then the erasing-time is substantially the readout-time plus the time that is needed for bridging the spacing between the reading unit and the erasing unit.

The time for reading out an imaging plate results from the afterglow duration of the storage phosphor. If the light-sensitive layer of an imaging plate contains a BaFBr:Eu material by way of storage phosphor, then the afterglow duration after irradiating with the laser light that is used for readout amounts to 880 ns. From this, a readout duration of an order of magnitude of 10 s results for imaging plates for intra-oral application.

Tubular fluorescent lamps are suitable as sources of light for the erasing unit 14 also for the reason that they exhibit a high energy efficiency. A further advantageous aspect of such lamps is that they heat up only a little, so that the imaging plates are not damaged by the action of heat in the course of erasure.

In order not to exclude components in the spectrum of the fluorescent lamp 48 that are useful for the erasing, a plastic film which operates as an optical cut-off filter may be arranged around said lamp. This is selected in such a way that only lets through the spectral components that are desirable for the purpose of erasing, with wavelengths above 480 nm.

In the exemplary embodiment being considered here, instead of such a plastic film the exit window 40 is produced from a transparent material that exhibits appropriate filter characteristics.

Such a cut-off filter is also advantageous with regard to an additional light barrier between the erasing unit and the reading unit, since a blue filter for fluorescent light, which only lets through wavelengths below approximately 450 nm, is arranged upstream of the photodetector of the reading unit. This blue filter blocks off the erasing light.

A perfect erasure when reading out storage centres that have not yet been deactivated is also guaranteed, for the reason that the axial dimension of the exit window 40 is distinctly greater than that of the annular gap 26 or the diameter of the readout beam 28.

In practice, for the stated reasons, axial dimensions of the exit window 40 that are about 20 to 100 times greater than those of the annular gap 26 are entirely sufficient.

In the course of moving across the exit window 40, the storage centres that have not yet been deactivated in the course of readout are consequently erased, and if the imaging plate 30 has then passed over the exit window 40 completely it can be used directly for a new X-ray exposure.

In order to prevent erasing light emerging through the exit window 40 (and fluorescent light arising in the course of erasing) from getting back to the reading unit 12, where they could disturb the readout of subsequent image regions, an annular light barrier 46 is provided between the reading unit 12 and the erasing unit 14.

For the sake of greater ease of representation, in the drawing the light barrier 46 has been represented with dimensions in the conveying direction of the imaging plate that are distinctly increased in comparison with practical application. In practical exemplary embodiments the light barrier 46 will be chosen to be precisely so long as necessary in the plate-conveying direction with regard to adequate effectiveness of the light barrier.

The closer the exit window 40 can be shifted towards the annular gap 26, the less does the total time needed for the readout and erasing differ from the time that is needed for pure readout.

Figure 2:
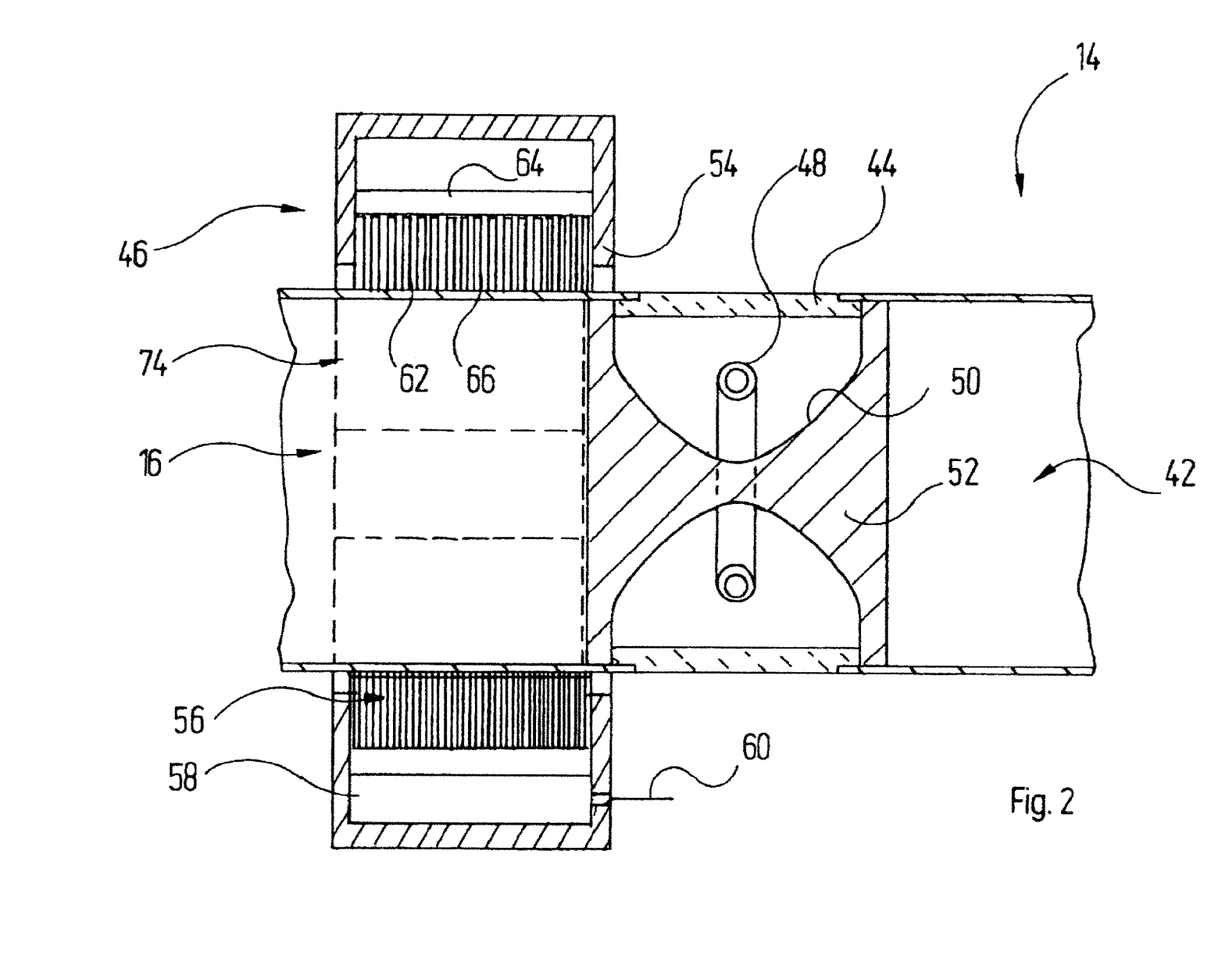
FIG. 2: shows an axial section through a light barrier which is arranged between the erasing head and the reading head of the combined device according to FIG. 1.

FIG. 2 shows a practical exemplary embodiment of an erasing device with upstream light barrier.

Behind the exit window 44, which takes the form of an annular glass or plastic body, an annular fluorescent lamp 48 is located. Behind this a toroidal parabolic mirror 50 is located which is constituted by the frosted surface of a rotationally symmetrical mirror body 52. The latter is inserted flush into the interior of the ends of the mounting tables 16 and 39 of the readout unit 12 and the erasing unit 14, respectively.

The light barrier 46 has a housing 54 which surrounds a cylindrical lamellar bundle 56, subject to radial clearance, so that outside the lamellar bundle an annular space 58 is obtained which is connected to a cooling-gas feed line 60.

The lamellar bundle 56 consists of first lamellar discs 62 and second lamellar discs 64 stacked alongside one another in alternating manner. These discs have the same outside diameter but greatly differing inside diameters, so that axially flat annular pockets 66 between the lamellae 62 and 64 are obtained, the radial extent of which is large in comparison with their axial dimension.

The lamellar discs 62, 64 are lacquered black or provided in some other way with a surface that absorbs erasing light emitted from the fluorescent lamp 48, and preferably also fluorescent light.

Figure 3:
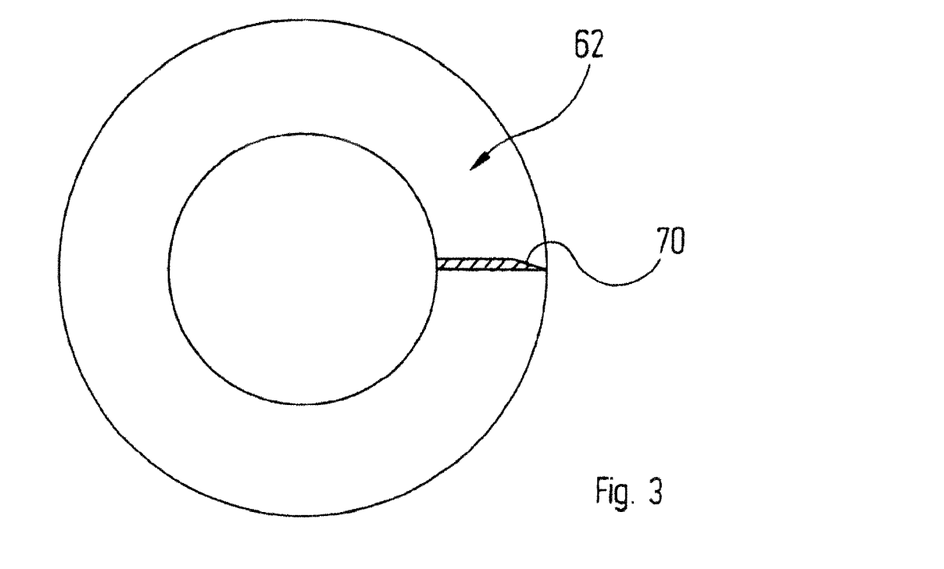
FIG. 3: shows an enlarged top view of a first type of ring lamella, which is used in constructing the light barrier according to FIG. 2.

The two types of lamellar discs 62 and 64 are shown in more detail in FIG. 3.

The lamellar discs exhibiting small radial width are in each instance interrupted at a point on their periphery, as shown at 68. In this way, cooling gas is able to flow from the bottom of the pockets 66 to their open end when cooling gas is applied to the annular space 58.

The light barrier 46 operates in such a way that it absorbs light reflected from the surface of the mounting table 16, or light reflected from an imaging plate.

But a certain residual reflection is also characteristic of surfaces that have been dyed black or dyed otherwise so as to be light-absorbing. For this reason, the surfaces situated radially on the inside of the ring openings are kept small by virtue of the fact that only very small axial dimension is given to the first lamellar discs 62. Typically these lamellae may have been produced from a material similar to that of razor-blades—that is to say, they have a thickness of only 0.1 mm.

In order to reduce the size of the front faces further, the internal edges of the lamellar discs 62 can be sharpened like knife-edges, as indicated at 70 in FIG. 3, with the angled side of the sharpening 70 in the disc stack pointing towards the erasing unit 14.

Figure 5:
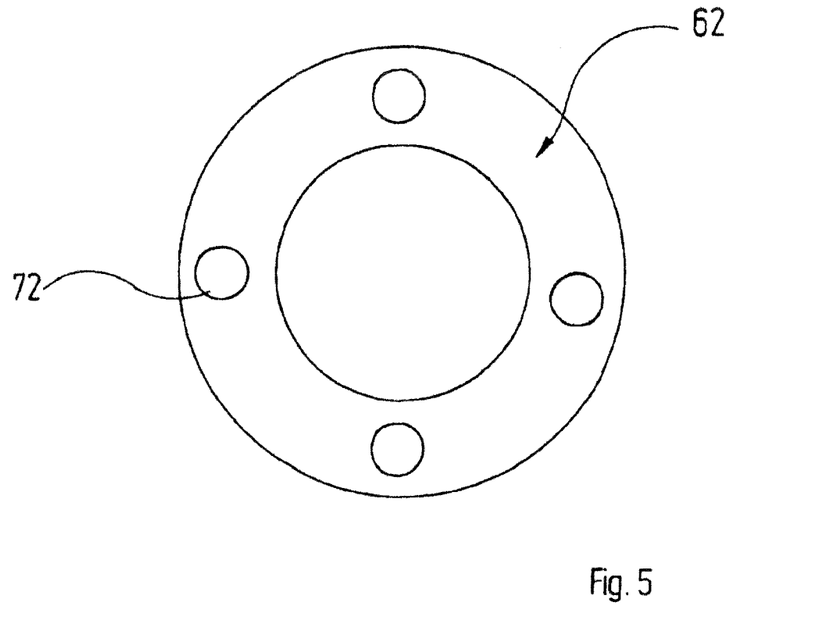
FIG. 5: shows a top view of another modified type of a circular lamella from which a stack of spaced shielding lamellae can be produced.

Alternatively, the lamellar bundle 56 may also be exhibited from lamellar discs of the same type if the latter are provided with protruding sections as shown in FIG. 5. Therein, in a lamellar disc 62 as also already shown in FIG. 3, circular regions 72 have been pressed out axially.

Figure 4:
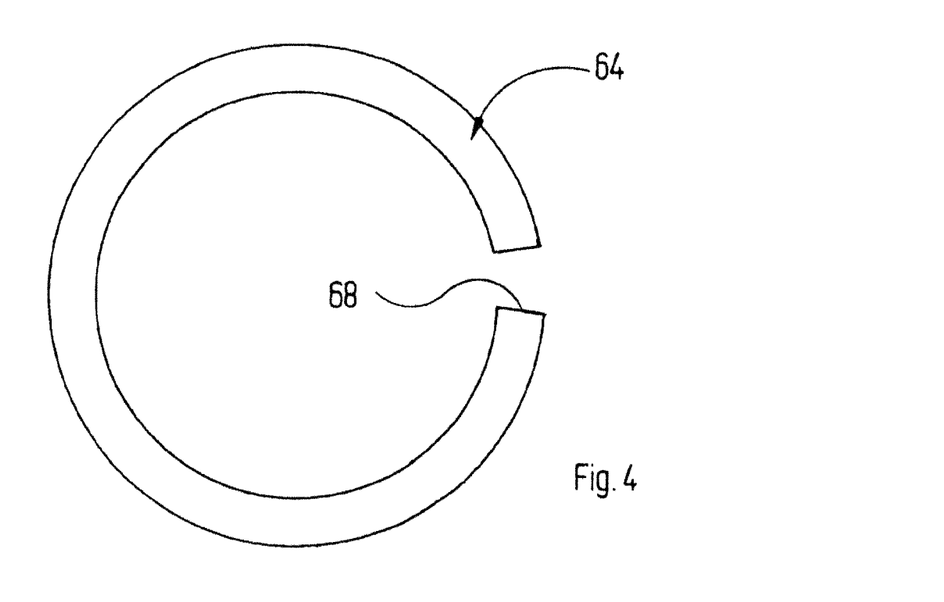
FIG. 4: shows a top view of a second circular type of lamella, which is used in constructing the light barrier according to FIG. 2.

These pressed-out regions may also have larger axial dimensions than the thickness of the lamellar disc 62, so that pockets 66 exhibiting greater axial dimension are obtained. But, as in the case of the exemplary embodiment according to FIG. 4, in which the lamellar discs 62 and 64 were of equal thickness, the axial dimension of the pressed-out circular regions 72 may also be chosen to be substantially the same size as the thickness of the lamellar disc 62, and a lamellar bundle 56 is then obtained as shown in FIG. 2, with the single difference that the pockets 66, apart from small peripheral interruptions, are continuously connected to the annular space 58. By this means, a cooling of all the lamellar discs is obtained that is highly uniform in the peripheral direction.

It will be understood that the lamellar discs according to FIG. 5 are stacked one behind the other for the purpose of forming the lamellar bundle 56 in such a way that their pressed-out regions 72 are offset in relation to one another by 45°.

If desired, a light barrier of the type described above may also be provided on the inside of the mounting table 16, as indicated by a dashed line at 74.

The radial position of the inner edges of the lamellar discs 62 (and correspondingly the radii of the external edges of similar lamellar discs in a light barrier 74) is chosen in such a way that, on the one hand, they are situated as close as possible to the outside of an imaging plate 30 being moved past and, on the other hand, a direct contact is certainly avoided.

In practice, the spacings between the inner edges of the lamellar discs 62 (or of the outer edges of lamellar discs of a light barrier 74) may exhibit a spacing of 0.1 mm to 0.5 mm from the adjacent surface of the imaging plate 30. In this way, the light barrier 44 operates in contact-free manner and nevertheless ensures, by virtue of the deep absorbent pockets 66, that no light gets from the erasing unit 14 to the reading unit 12.

Figure 6:
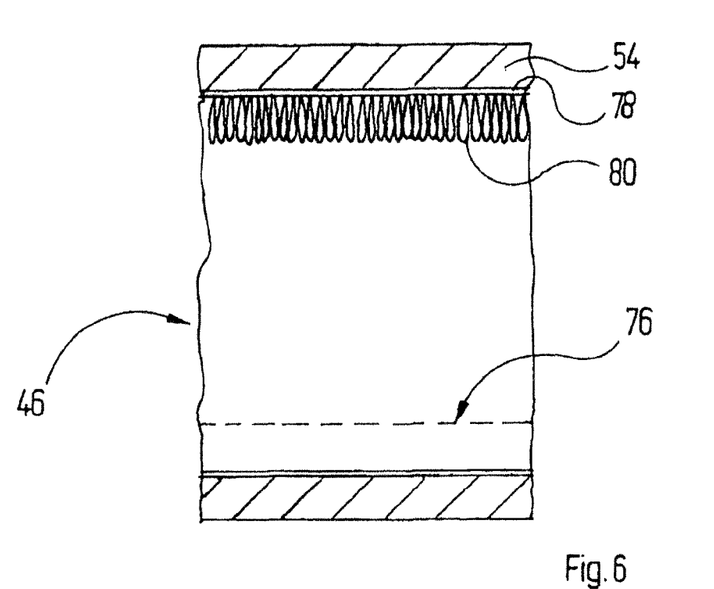
FIG. 6: shows an axial section through a modified light barrier.

As an alternative to a light barrier 46 with a lamellar bundle 56 as described above, use may also be made of a light barrier 46 according to FIG. 6, the manufacturing costs of which are low.

A layer of a pile-loop fabric 76 has been directly applied onto the inside of the sheath-shaped housing 54. Said fabric consists of a fabric layer 78 and a plurality of pile loops 80 bearing said layer.

The height of the pile loops 80 is chosen in such a way that they exhibit only small spacing from the adjacent upper side of an imaging plate being moved past.

Since the pile loops 80 are closed, they do not have any sharp edges that have arisen as a result of cutting away fibres and that, with an imaging plate frequently running past, could generate scratch marks or stress marks on said imaging plate.

As is evident from the drawing, the pile loops 80 are set closely together so that they stabilise one another against the influence of gravity. The pile loops consequently remain substantially radially aligned over the entire periphery of the inner surface of the housing 54.

The pile loops 80 are produced from a flexible material which is pigmented in volume. In this connection, in particular fine carbon-black and black plastic dust—as used in toner powders, for example—enter into consideration as pigments.

In order once again to avoid reflections on the fibre surface, the latter is frosted, it being possible for this to be effected in a manner known as such in the finishing of plastic films by chemical etching or by treating in a gas discharge.

Figure 7:
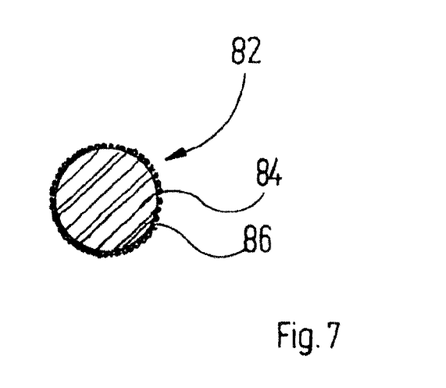
FIG. 7: shows a transverse section through an absorbent textile thread.

Alternatively, as shown in FIG. 7, for the purpose of producing the pile loops use may also be made of a thread material 82 that exhibits a thermoplastic core and black absorber particles 86 firmly welded thereon. Such a thread material can be produced, for example, by drawing it through a hot powder bed consisting of the absorber particles and, after this treatment, by blowing off absorber particles 86 that are not firmly bonded.

Instead of the fluorescent lamp 48, use may also be made of other light-sources, the light of which exhibits a minor component in the blue and in the UV, for example a fluorescent lamp, the glass tube of which is coated with a red phosphor.

In order to be able to realise still shorter erasing-times, a halogen torch may also be employed. The latter has a higher power consumption and a higher light-emission intensity, relative to the area of the emitter (incandescent filament).

The walls of the erasing unit 14 surrounding the light-source are preferably coated with a material reflecting very well in respect of the erasing light, which reflects diffusely. Well suited, for example, are white or yellow foam material, white Teflon and brightly polished aluminium sheet. A particularly good reflection layer consists of a $BaSO_4$ material, in particular such a material that has been mixed with a yellow dyestuff. Any wall material can then be coated with this material.

Figure 8:
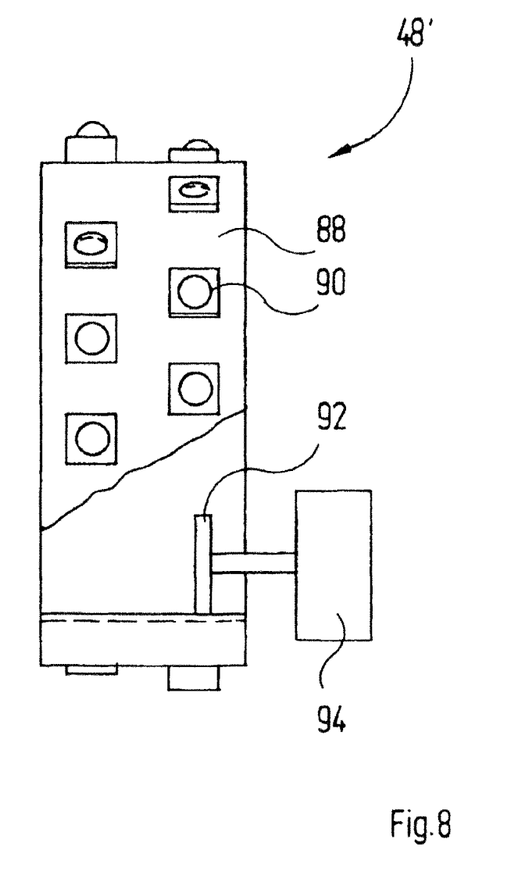
FIG. 8: shows a lateral, partly sectional, view of an LED erasing-light source and of a drive for said source.

However, in addition to the conventional light-sources mentioned above, solid-state light-sources (LEDs) are also suitable for erasing the imaging plates. These sources are currently only available as discrete individual elements with relatively small dimensions. In order to fill out the entire annular exit window with an annular light curtain, instead of the fluorescent lamp 48 use is made of an annular LED light-source 48' as shown in FIG. 8.

On the outside of a carrying ring 88 there are arranged, regularly distributed in the peripheral direction, light-emitting diodes 90, the operating wavelength of which lies above 480 nm (typically around 630 nm), so that their light is suitable for erasing purposes but the readout of the imaging plate is not disadvantageously impaired.

With regard to the uniformity of illumination of the exit window, preferably two axially spaced rings of light-emitting diodes 90 are provided, in which the individual light-emitting diodes are offset in relation to one another by half a pitch.

It will be understood that the light-emitting diodes are situated at an appropriate distance behind the exit window 40 in such a manner that the light cones emitted from them just overlap on the outer surface of the exit window 40.

For the purpose of still further homogenisation of the illumination of the exit window 40, the exit window 40 may be frosted, and/or the carrying ring 88 may also be provided with an internal gearing and may be rotated via a pinion 92, so that residual ripples in the intensity distribution in the peripheral direction fall out as a result of temporal averaging. Hence a homogeneously good erasure of the imaging plate 30 when passing through the erasing unit 14 is guaranteed.

If imaging plates of greatly differing dimensions are erased in the erasing unit 14, the light-emitting diodes 90 may be subdivided into groups also in the peripheral direction, and, for the purpose of erasing, only those groups may be activated in each instance which together cover the width of the imaging plate 10.

For the purpose of improving the dissipation of heat, the carrying ring 88, like the light-emitting diodes 90, may be produced from material that conducts heat well, for example aluminium. Where appropriate, the carrying ring 88 may also be cooled by being subjected to incident flow of air, or by means of a liquid coolant circulated in an internal coolant channel.

If the scanner is a flat-picture scanner, then a shielding (where appropriate, also in addition to the shielding measures described above) of the readout unit 12 against erasing light may be brought about by the imaging plate being guided in front of the reading unit in planes that are spaced from one another and preferably parallel to one another.

Figure 9:
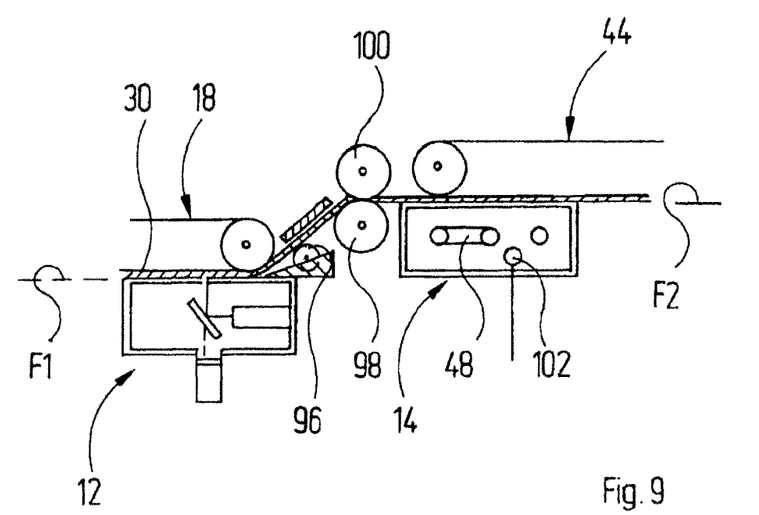
FIG. 9: shows a lateral view of a modified readout device of the flatbed-scanner type.

An exemplary embodiment of such a type is shown in FIG. 9. Parts of the readout and erasing device that correspond, from the viewpoint of function, to those in the exemplary embodiments described above are again provided with the same reference symbols and do not need to be described again in detail below.

The readout and erasing device 10 shown in FIG. 9 takes the form of a flat-picture scanner. The imaging plate 30 is consequently moved through the readout unit 12 in a flat configuration.

Behind the readout unit 12 three rollers 96, 98, 100 are now provided which deflect the imaging plate 30 out of a first conveying plane F1, which applies in the case of the readout unit 12, into a second parallel conveying plane F2 spaced upwards, which applies in the case of the erasing unit 14.

By virtue of this step in the conveying path, the danger is that erasing light emitted from the erasing unit 14, which reaches the environment on leakage thread, does not reach the readout unit 12. If the rollers 96 to 100 extend over the entire width of the imaging plate 30, the rollers 96, 98, 100 furthermore constitute additional screens partitioning the light, which engage the imaging plate 30 in practically spacing-free manner.

It is known that both broadband erasing-light sources such as fluorescent lamps, halogen lamps or xenon lamps are subject to an ageing process by which the emitted quantity of light is reduced. Also in the case of narrowband erasing-light sources, such as LEDs, there is a decline in the emitted luminous flux, which is associated with increasing operating-time.

In order to counter this, as likewise shown in FIG. 9, in the erasing unit 14 a photodiode 102 or another light-sensitive element may be provided, the output signal of which changes in accordance with the change in the luminous flux generated by the lamp. The output signal of the photodiode 102 can then be used either to increase the operating current of the light-source in such a way that the emitted luminous flux remains unchanged, or to reduce the conveying speed of the imaging plate 30 in the region of the erasing unit 14 in such a way that the same radiation dose is obtained even with reduced luminous flux.

In the case where use is made of a narrowband erasing-light source, the peak wavelengths can be adapted to the peak wavelength of the absorption of the F-centres of the phosphor material in order to obtain a particularly efficient erasing of remaining image residues.

In further modification of the exemplary embodiments described above, by using optical elements (mirrors, lenses) the angular range of the erasing lamp can be restricted to those spatial regions in which the imaging plate runs past in front of the erasing unit. In this way, an increase in the intensity of the erasing light is obtained, and correspondingly the possibility of a shortening of the erasing-time.

The invention claimed is:

1. A device for reading out exposed imaging plates, comprising:
   retaining means for retaining in a given geometry an imaging plate to be read out,
   with a reading unit which generates a reading light beam which is moved in a first scanning direction, the reading unit including a detection device for detecting fluorescent light released in the imaging plate by the reading beam, and
   with a drive device for generating a relative motion between the imaging plate and the reading unit in a second scanning direction, different from the first scanning direction,
   wherein an erasing unit is arranged behind the reading unit in the second scanning direction, the erasing unit being aligned with the reading unit, wherein the drive device extends over both the reading unit and the erasing unit and moves the imaging plate through the reading unit first and the erasing unit second, and in that a light barrier is arranged between the reading unit and the erasing unit.

2. The device of claim 1, wherein the light barrier includes a pile made of absorbent textile material.

3. The device of claim 2, wherein the pile is a loop pile.

4. The device of claim 2, wherein the pile is produced from a material that absorbs light in volume.

5. The device of claim 4, wherein the absorbent material is frosted on its outside.

6. The device of claim 2, wherein the outer surface of the textile material is studded with absorbent particles.

7. The device of claim 1, further comprising a light-source of the erasing unit including a fluorescent lamp.

8. The device of claim 7, wherein the walls of the erasing unit surrounding the erasing-light source are designed to be diffusely reflecting.

9. The device of claim 7, wherein the walls of the erasing unit surrounding the erasing-light source are provided with a coating that reflects erasing light well.

10. The device of claim 1, further comprising a light-source of the erasing unit including a plurality of light-emitting diodes which are spaced in such a manner that their light cones overlap in the surface of the plate.

11. The device of claim 10, wherein the light-emitting diodes are arranged in several rows spaced in the conveying direction of the imaging plate, and the diodes of consecutive rows are offset in relation to one another.

12. The device of claim 10, wherein the light-emitting diodes are arranged on a carrying body which is driven in the direction perpendicular to the conveying direction of the imaging plates.

13. The device of claim 1, further comprising a light-sensitive element which has erasing light applied to it.

14. The device of claim 13, further comprising a device for regulating the luminous flux emitted by the erasing-light source, which operates as a function of the output signal of the light-sensitive element which has erasing light applied to it.

15. The device of claim 1, wherein a spectrum of the light source is set to a maximum of an absorption of the storage centres of the imaging plate.

16. The device of claim 1, further comprising a means for collecting erasing light emitted by the erasing unit onto a spatial region in which an imaging plate is moved past the erasing unit.

17. The device of claim 1 wherein the imaging plate is only moved in the second scanning direction.

18. A device for reading out exposed imaging plates comprising:
   retaining means for retaining an imaging plate in a cylindrical geometry;
   a reading unit which generates a reading light beam which is moved in a first scanning direction, the reading unit including a detection device for detecting fluorescent light released in the imaging plate by the reading beam;
   a cylindrically shaped mounting table having an annular gap extending in a peripheral direction through which the reading beam light emerges;
   a drive device for generating a relative motion between the imaging plate and the reading unit in a second scanning direction, different from the first scanning direction;
   an erasing unit arranged behind the reading unit in the direction of the second scanning direction behind the reading unit and arranged so that the drive device is designed in such a way that it also extends over the erasing unit; and
   a light barrier fixed between the reading unit and the erasing unit.

19. The device of claim 18 wherein the imaging plate is fed to the mounting table in the second scanning direction, so that all movement required to read and erase the imaging plate is done in a single conveying direction.

20. The device of claim 18 wherein the drive device is operated in a continuous manner once the imaging plate is introduced into the reading unit.

* * * * *